(12) United States Patent
Tseng

(10) Patent No.: US 10,568,114 B2
(45) Date of Patent: Feb. 18, 2020

(54) METHOD AND APPARATUS FOR REQUESTING RESOURCES IN A WIRELESS COMMUNICATION SYSTEM

(71) Applicant: INNOVATIVE SONIC CORPORATION, Taipei (TW)

(72) Inventor: Li-Chih Tseng, Taipei (TW)

(73) Assignee: Innovative Sonic Corporation, Taipei (TW)

(*) Notice: Subject to any disclaimer, the term of this patent is extended or adjusted under 35 U.S.C. 154(b) by 263 days.

(21) Appl. No.: 14/856,942

(22) Filed: Sep. 17, 2015

(65) Prior Publication Data

US 2016/0081108 A1 Mar. 17, 2016

Related U.S. Application Data

(60) Provisional application No. 62/051,500, filed on Sep. 17, 2014.

(51) Int. Cl.
*H04W 72/12* (2009.01)
*H04W 72/04* (2009.01)

(52) U.S. Cl.
CPC ... *H04W 72/1242* (2013.01); *H04W 72/0493* (2013.01)

(58) Field of Classification Search
CPC . H04W 28/0278; H04W 28/16; H04W 72/02; H04W 72/04; H04W 72/0446; H04W 72/10; H04W 72/12
See application file for complete search history.

(56) References Cited

U.S. PATENT DOCUMENTS

| 9,247,546 B2* | 1/2016 | Park | H04W 4/005 |
| 9,723,618 B2* | 8/2017 | Loehr | H04W 72/10 |
| 2010/0260152 A1* | 10/2010 | Englund | H04L 47/14 370/336 |

(Continued)

FOREIGN PATENT DOCUMENTS

| JP | 2012503379 A | 2/2012 |
| KR | 1020090034527 A1 | 4/2009 |
| KR | 1020090084718 A1 | 8/2009 |

OTHER PUBLICATIONS

Office Action on corresponding JP Patent Application No. 2015-184528 dated Jul. 26, 2016.

(Continued)

*Primary Examiner* — Brian D Nguyen
(74) *Attorney, Agent, or Firm* — Blue Capital Law Firm, P.C.

(57) ABSTRACT

A method and apparatus are disclosed for requesting resources in a wireless communication system. The method includes sending a first SA in a first SA period at a first timing. The method also includes considering a data available in the UE at a second timing, wherein the data needs to be transmitted and the second timing is later than the first timing. The method further includes skipping a resource associated with the first SA for sending the data at a third timing, wherein the third timing is later than the second timing and earlier than a second SA period which is later than the first SA period. In addition, the method includes sending a second SA in the second SA period. Furthermore, the method includes sending the data on a resource associated with the SA.

21 Claims, 15 Drawing Sheets

(56) References Cited

U.S. PATENT DOCUMENTS

| | | | |
|---|---|---|---|
| 2010/0322156 A1* | 12/2010 | Wu | H04L 1/1867 370/329 |
| 2010/0330995 A1* | 12/2010 | Aoyama | H04W 28/10 455/436 |
| 2011/0255492 A1 | 10/2011 | Dai et al. | |
| 2013/0235768 A1* | 9/2013 | Earnshaw | H04L 1/1671 370/280 |
| 2013/0301446 A1* | 11/2013 | Chen | H04W 72/0413 370/252 |
| 2013/0322413 A1* | 12/2013 | Pelletier | H04W 72/1289 370/336 |
| 2014/0185467 A1* | 7/2014 | Heo | H04W 52/54 370/252 |
| 2014/0254509 A1 | 9/2014 | Chen et al. | |
| 2016/0183239 A1* | 6/2016 | Lee | H04W 56/0015 370/329 |
| 2016/0183276 A1* | 6/2016 | Marinier | H04W 72/02 370/329 |
| 2016/0205714 A1* | 7/2016 | Morita | H04W 76/14 455/450 |
| 2016/0381666 A1* | 12/2016 | Kim | H04W 52/0216 370/329 |
| 2017/0019812 A1* | 1/2017 | Lee | H04W 24/02 |
| 2017/0041942 A1* | 2/2017 | Wallentin | H04W 72/1231 |
| 2017/0215160 A1* | 7/2017 | Lohr | H04W 56/002 |

OTHER PUBLICATIONS

3GPP TSG-RAN WG1 Meeting#76bis, Shenzhenn, China, Mar. 31-Apr. 4, 2014(R1-141390).
3GPP TSG-RAN WG1 Meeting#78, Dresden, Germany, 18th-22nd 2014(R1-142898).
3GPP TSG-RAN WG1 Meeting#78, Dresden, Germany, 18th-22th 2014(R1-143367).
3GPP TSG-RAN WG2 #61, 11th-15th 2008, Sorrento, Italy (R2-081070).
3GPP TSG-RAN WG2 #85bis, Valencia, Spain, Mar. 31-Apr. 4, 2014(R2-141256).
Search Report on corresponding EP Patent Application No. 15185676.2 dated Feb. 8, 2016.
Office Action on corresponding KR Patent Application No. 10-2015-0131666 dated Apr. 1, 2016.
3GPP TSG RAN WG1 Meeting #78, Dresden, Germany, Aug. 18-22, 2014 (R1-142930).
Office Action on corresponding JP Patent Application No. 2015-184528 dated Nov. 13, 2018.

* cited by examiner

R/R/E/LCID sub-header

METHOD AND APPARATUS FOR REQUESTING RESOURCES IN A WIRELESS COMMUNICATION SYSTEM

CROSS-REFERENCE TO RELATED APPLICATIONS

The present application claims the benefit of U.S. Provisional Patent Application Ser. No. 62/051,500 filed on Sep. 17, 2014, the entire disclosure of which is incorporated herein by reference.

FIELD

This disclosure generally relates to wireless communication networks, and more particularly, to a method and apparatus for requesting resources in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for requesting resources in a wireless communication system. The method includes sending a first scheduling assignment (SA) in a first SA period at a first timing. The method also includes considering a data available in the UE at a second timing, wherein the data needs to be transmitted and the second timing is later than the first timing. The method further includes skipping a resource associated with the first SA for sending the data at a third timing, wherein the third timing is later than the second timing and earlier than a second SA period which is later than the first SA period. In addition, the method includes sending a second SA in the second SA period. Furthermore, the method includes sending the data on a resource associated with the SA.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including SP-110638, "WID on Proposal for a study on Proximity-based Services"; R2-141256, "Layer 2 procedures for D2D Communication", Ericsson; R2-140625, "Resource allocation for D2D transmitters in coverage", Ericsson; TS 36.321 V11.2.0, "Medium Access Control (MAC) protocol specification"; R1-143590, "Chairman's Notes of Agenda Item 7.2.3 LTE Device to Device Proximity Services", Session Chairman (Alcatel-Lucent). The standards and documents listed above are hereby expressly incorporated by reference in their entirety.

Figure 1:
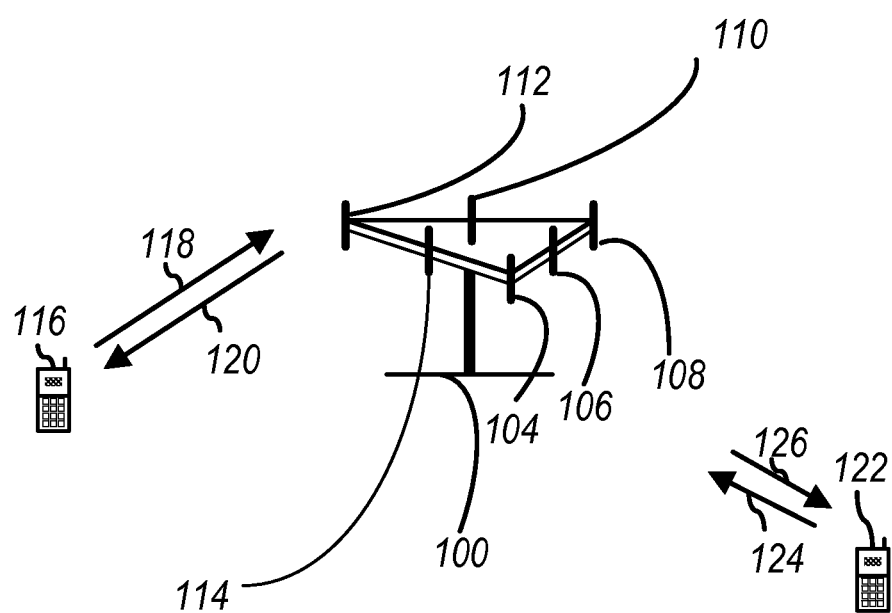
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
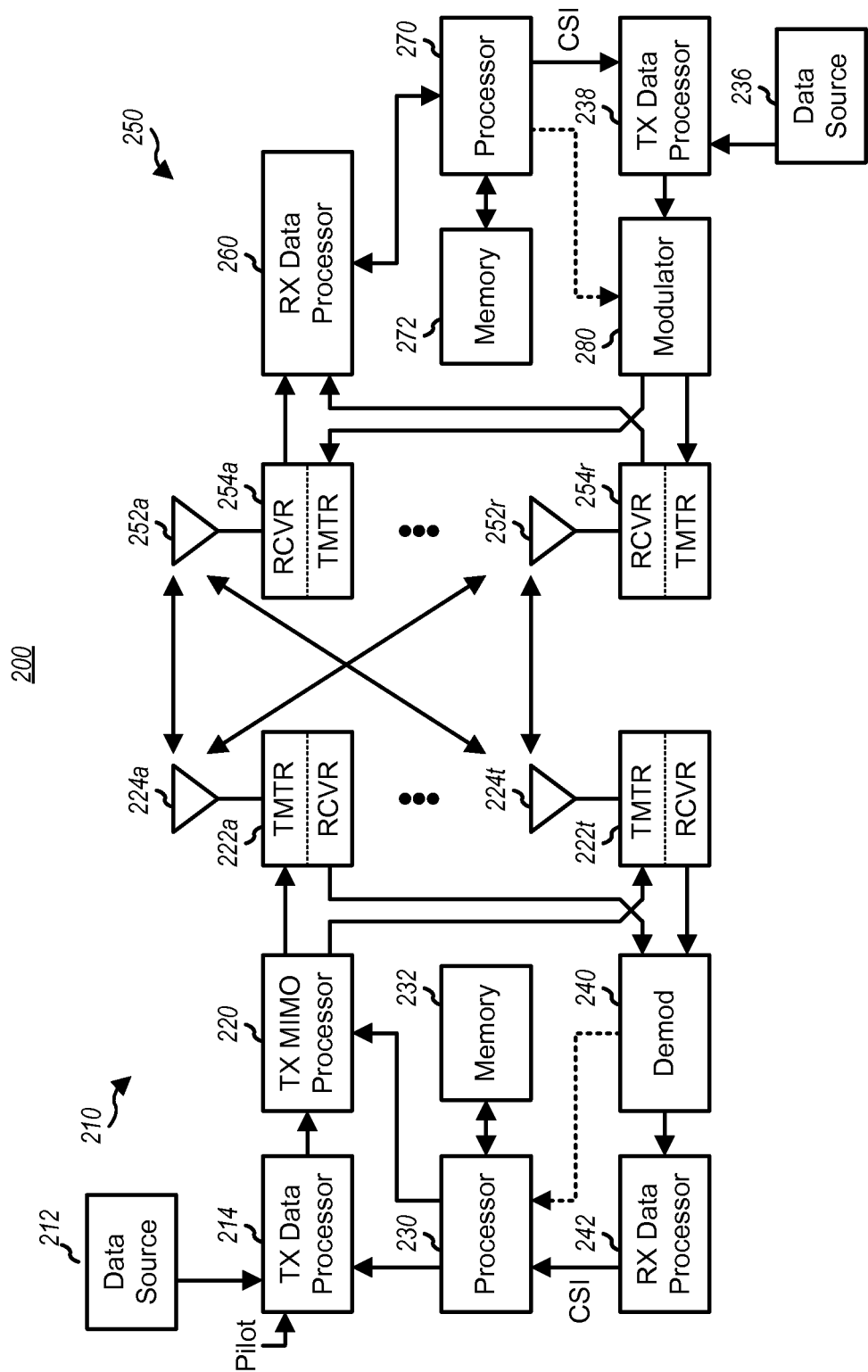
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
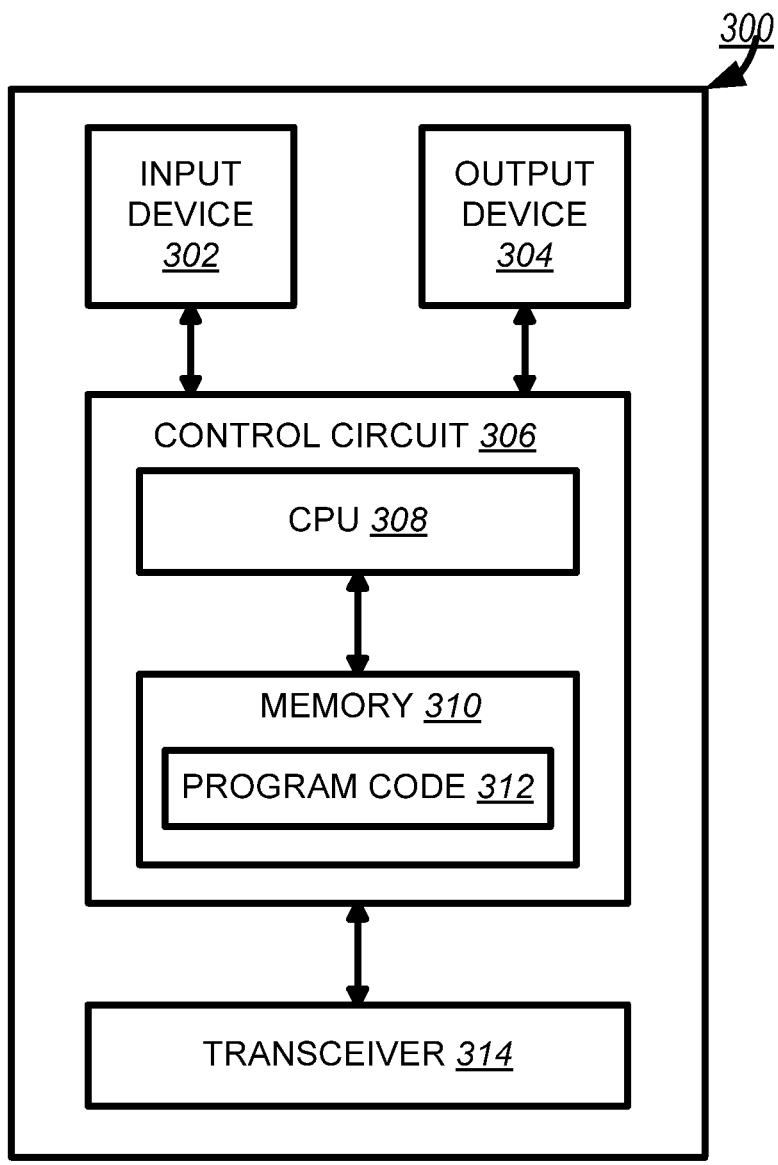
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
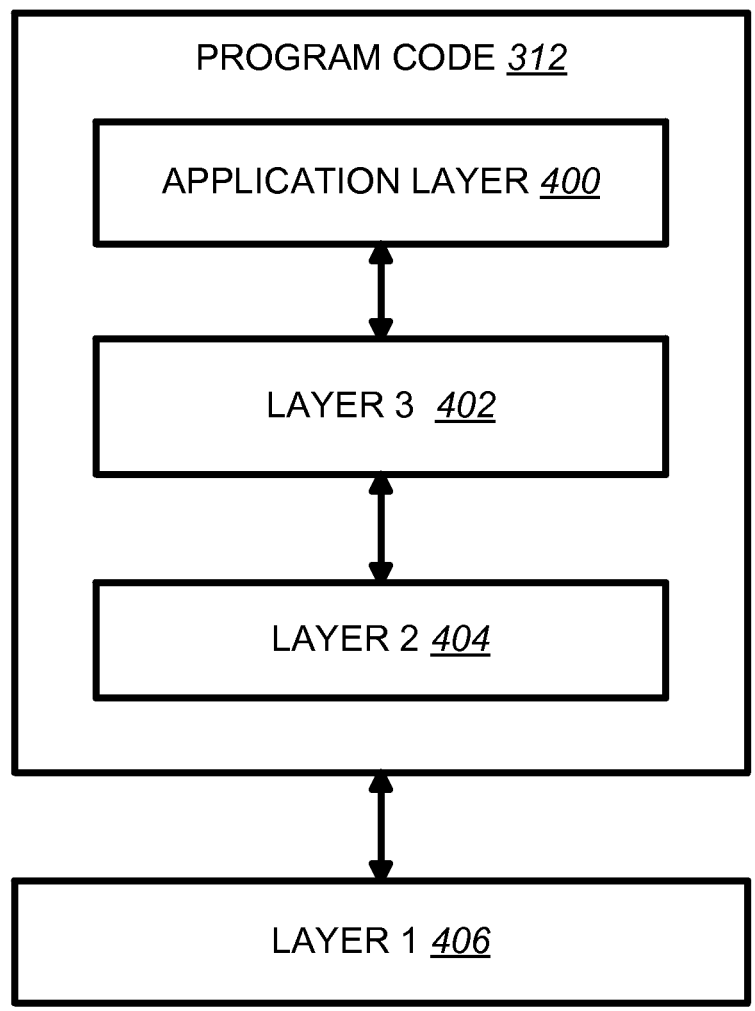
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP SP-110638 proposes a new study item on proximity-based services (ProSe), i.e., D2D (Device to Device) services. As described in 3GPP SP-110638, the justification and objective of this study item are as follows:

3 Justification

Proximity-based applications and services represent a recent and enormous socio-technological trend. The principle of these applications is to discover instances of the applications running in devices that are within proximity of each other, and ultimately also exchange application-related data. In parallel, there is interest in proximity-based discovery and communications in the public safety community.

Current 3GPP specification are only partially suited for such needs, since all such traffic and signalling would have to be routed in the network, thus impacting their performance and adding un-necessary load in the network. These current limitations are also an obstacle to the creation of even more advanced proximity-based applications.

In this context, 3GPP technology, has the opportunity to become the platform of choice to enable proximity-based discovery and communication between devices, and promote a vast array of future and more advanced proximity-based applications.

4 Objective

The objective is to study use cases and identify potential requirements for an operator network controlled discovery and communications between devices that are in proximity, under continuous network control, and are under a 3GPP network coverage, for:
 1. Commercial/social use
 2. Network offloading
 3. Public Safety
 4. Integration of current infrastructure services, to assure the consistency of the user experience including reachability and mobility aspects Additionally, the study item will study use cases and identify potential requirements for
 5. Public Safety, in case of absence of EUTRAN coverage (subject to regional regulation and operator policy, and limited to specific public-safety designated frequency bands and terminals)

Use cases and service requirements will be studied including network operator control, authentication, authorization, accounting and regulatory aspects.

The study does not apply to GERAN or UTRAN.

As discussed in 3GPP RAN2#85 Chairman's Notes, it was agreed in the RAN2#85 meeting that the UE can request D2D resource from network via a Random Access (RA) procedure as follows:

2 In Mode 1, a UE requests transmission resources from an eNB. The eNB schedules transmission resources for transmission of scheduling assignment(s) and data.

2a In Mode 1, the UE sends a scheduling request (D-SR or RA) to the eNB followed by a BSR based on which the eNB can determine that the UE intends to perform a D2D transmission as well as the required amount resources.

3GPP R2-141256 introduces a D2D resource request/grant procedure using random access (RA) procedure and a new MAC (Medium Access Control) control element, called D2D BSR (Buffer Status Report), as follows:

2.1 Request/Grant Procedure

This procedure applies only to communication mode 1. When initiating this procedure, the UE has been configured with a logical channel for D2D Communication. It is also assumed that the UE is in RRC_CONNECTED. The purpose of this procedure is for the UE to get a grant from the eNB to transmit on the ProSe physical channel. There are two cases, whether the UE has a PUCCH resource to send the Scheduling Request on or not.

[ . . . ]

2.1.2 The UE does not have a PUCCH Resource

In this case the UE needs to perform a random access procedure. We think that the current random access procedure can be reused. FIG. 1 shows how the random access procedure is used to support D2D Communication requests and grants.

Figure 5:
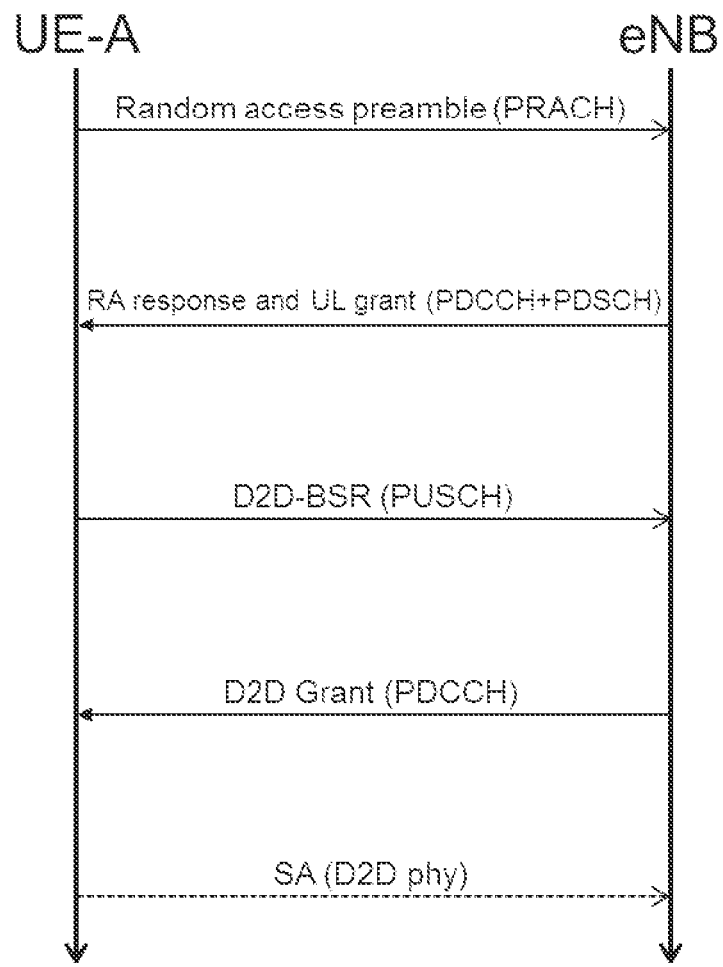
FIG. 5 is a reproduction of FIG. 2 of 3GPP R2-141256.

[FIG. 2 of 3GPP R2-141256 has been reproduced as FIG. 5]

[ . . . ]

2.1.3 The D2D-BSR

The D2D-BSR should be transmitted on the PUSCH similar to legacy BSR. The purpose of the D2D-BSR is for the UE to inform the eNB about the amount of data the UE has on logical channels related to D2D. As mentioned earlier, the eNB configures the UE with a logical channel ID to be used for D2D communication. Although this makes it possible to reuse the existing BSR, it would require at least one logical channel group for D2D communication. If the UE is also configured with legacy LTE bearers and D2D discovery, the four existing logical channel groups may become a restriction.

We think it is better to introduce a new MAC CE, called ProSe BSR, which would be used to indicate the buffer status of D2D services. The exact details of this new BSR are FFS.

Proposal 3 Introduce a new MAC CE (ProSe BSR) which the UE uses to indicate the buffer status of D2D services.

3GPP R2-140625 proposes a mechanism, which is similar with legacy mechanism, for transmitting D2D BSR as follows:

2.1.1.4 Proposed Request/Grant Procedure for D2D

Based on the above discussion and the identified problems in observation 3, we propose the following request/grant procedure for D2D:
 Step 1.1 UE sends SR (Scheduling Request) to eNB via PUCCH;
 Step 1.2 eNB grants UL resource (for UE to send BSR) via PDCCH, scrambled by C-RNTI;
 Step 1.3 UE sends D2D BSR indicating the buffer status via PUSCH;
 Step 1.4 eNB grants D2D resource (for UE to send data) via PDCCH, scrambled by D2D-RNTI.

Upon completion of this procedure the UE will have a D2D resource to transmit the data on.

Proposal 1 Before performing a D2D transmission in coverage, the UE shall get a grant from the network.

3GPP TS 36.321 v11.2.0 introduces and describes how a BSR triggers a SR (Schedule Request)/D-SR (Dynamic Schedule Request) procedure or a Random Access procedure for transmission and legacy BSR format as follows:

5 MAC Procedures 5.1 Random Access procedure

[ . . . ]

5.1.3 Random Access Preamble Transmission

The random-access procedure shall be performed as follows:
 set PREAMBLE_RECEIVED_TARGET_POWER to preambleInitialReceivedTargetPower+DELTA_PREAMBLE+(PREAMBLE_COUNTER_−1)*powerRampingStep;

instruct the physical layer to transmit a preamble using the selected PRACH, corresponding RA-RNTI, preamble index and PREAMBLE_RECEIVED_TARGET_POWER.

5.1.4 Random Access Response reception

Once the Random Access Preamble is transmitted and regardless of the possible occurrence of a measurement gap, the UE shall monitor the PDCCH of the PCell for Random Access Response(s) identified by the RA-RNTI defined below, in the RA Response window which starts at the subframe that contains the end of the preamble transmission [7] plus three subframes and has length ra-ResponseWindowSize subframes. The RA-RNTI associated with the PRACH in which the Random Access Preamble is transmitted, is computed as:

$$RA\text{-}RNTI = 1 + t\_id + 10 * f\_id$$

Where t_id is the index of the first subframe of the specified PRACH ($0 \leq t\_id < 10$), and f_id is the index of the specified PRACH within that subframe, in ascending order of frequency domain ($0 \leq f\_id < 6$). The UE may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the UE shall regardless of the possible occurrence of a measurement gap:
  if the Random Access Response contains a Backoff Indicator subheader:
    set the backoff parameter value in the UE as indicated by the BI field of the Backoff Indicator subheader and Table 7.2-1.
  else, set the backoff parameter value in the UE to 0 ms.
  if the Random Access Response contains a Random Access Preamble identifier corresponding to the transmitted Random Access Preamble (see subclause 5.1.3), the UE shall:
    consider this Random Access Response reception successful and apply the following actions for the serving cell where the Random Access Preamble was transmitted:
      process the received Timing Advance Command (see subclause 5.2);
      indicate the preambleInitialReceivedTargetPower and the amount of power ramping applied to the latest preamble transmission to lower layers (i.e., (PREAMBLE_TRANSMISSION_COUNTER−1)*powerRampingStep);
      process the received UL grant value and indicate it to the lower layers;
      if ra-PreambleIndex was explicitly signalled and it was not 000000 (i.e., not selected by MAC):
        consider the Random Access procedure successfully completed.
      else, if the Random Access Preamble was selected by UE MAC:
        set the Temporary C-RNTI to the value received in the Random Access Response message no later than at the time of the first transmission corresponding to the UL grant provided in the Random Access Response message;
        if this is the first successfully received Random Access Response within this Random Access procedure:
          if the transmission is not being made for the CCCH logical channel, indicate to the Multiplexing and assembly entity to include a C-RNTI MAC control element in the subsequent uplink transmission;
          obtain the MAC PDU to transmit from the "Multiplexing and assembly" entity and store it in the Msg3 buffer.

NOTE: When an uplink transmission is required, e.g., for contention resolution, the eNB should not provide a grant smaller than 56 bits in the Random Access Response.

NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception is considered not successful and the UE shall:
  increment PREAMBLE_TRANSMISSION_COUNTER by 1;
  If PREAMBLE_TRANSMISSION_COUNTER=preambleTransMax+1:
    if the Random Access Preamble is transmitted on the PCell:
      indicate a Random Access problem to upper layers;
    if the Random Access Preamble is transmitted on an SCell:
      consider the Random Access procedure unsuccessfully completed.
  if in this Random Access procedure, the Random Access Preamble was selected by MAC:
    based on the backoff parameter in the UE, select a random backoff time according to a uniform distribution between 0 and the Backoff Parameter Value;
    delay the subsequent Random Access transmission by the backoff time;
  proceed to the selection of a Random Access Resource (see subclause 5.1.2).

5.1.5 Contention Resolution

Contention Resolution is based on either C-RNTI on PDCCH of the PCell or UE Contention Resolution Identity on DL-SCH.

Once Msg3 is transmitted, the UE shall:
  start mac-ContentionResolutionTimer and restart mac-ContentionResolutionTimer at each HARQ retransmission;
  regardless of the possible occurrence of a measurement gap, monitor the PDCCH until mac-ContentionResolutionTimer expires or is stopped;
  if notification of a reception of a PDCCH transmission is received from lower layers, the UE shall:
    if the C-RNTI MAC control element was included in Msg3:
      if the Random Access procedure was initiated by the MAC sublayer itself and the PDCCH transmission is addressed to the C-RNTI and contains an UL grant for a new transmission; or
      if the Random Access procedure was initiated by a PDCCH order and the PDCCH transmission is addressed to the C-RNTI:

consider this Contention Resolution successful;
stop mac-ContentionResolutionTimer;
discard the Temporary C-RNTI;
consider this Random Access procedure successfully completed.
else if the CCCH SDU was included in Msg3 and the PDCCH transmission is addressed to its Temporary C-RNTI:
if the MAC PDU is successfully decoded:
stop mac-ContentionResolutionTimer;
if the MAC PDU contains a UE Contention Resolution Identity MAC control element; and
if the UE Contention Resolution Identity included in the MAC control element matches the CCCH SDU transmitted in Msg3:
consider this Contention Resolution successful and finish the disassembly and demultiplexing of the MAC PDU;
set the C-RNTI to the value of the Temporary C-RNTI;
discard the Temporary C-RNTI;
consider this Random Access procedure successfully completed.
else
discard the Temporary C-RNTI;
consider this Contention Resolution not successful and discard the successfully decoded MAC PDU.
if mac-ContentionResolutionTimer expires:
discard the Temporary C-RNTI;
consider the Contention Resolution not successful.
if the Contention Resolution is considered not successful the UE shall:
flush the HARQ buffer used for transmission of the MAC PDU in the Msg3 buffer;
increment PREAMBLE_TRANSMISSION_COUNTER by 1;
If PREAMBLE_TRANSMISSION_COUNTER=preambleTransMax+1:
indicate a Random Access problem to upper layers.
based on the backoff parameter in the UE, select a random backoff time according to a uniform distribution between 0 and the Backoff Parameter Value;
delay the subsequent Random Access transmission by the backoff time;
proceed to the selection of a Random Access Resource (see subclause 5.1.2).
[ . . . ]

5.4.4 Scheduling Request

The Scheduling Request (SR) is used for requesting UL-SCH resources for new transmission.

When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission.

If an SR is triggered and there is no other SR pending, the UE shall set the SR_COUNTER to 0.

As long as one SR is pending, the UE shall for each TTI:
if no UL-SCH resources are available for a transmission in this TTI:
if the UE has no valid PUCCH resource for SR configured in any TTI: initiate a Random Access procedure (see subclause 5.1) on the PCell and cancel all pending SRs;
else if the UE has a valid PUCCH resource for SR configured for this TTI and if this TTI is not part of a measurement gap and if sr-ProhibitTimer is not running:
if SR_COUNTER<dsr-TransMax:
increment SR_COUNTER by 1;
instruct the physical layer to signal the SR on PUCCH;
start the sr-ProhibitTimer.
else:
notify RRC to release PUCCH/SRS for all serving cells;
clear any configured downlink assignments and uplink grants;
initiate a Random Access procedure (see subclause 5.1) on the PCell and cancel all pending SRs.

5.4.5 Buffer Status Reporting

The Buffer Status reporting procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to an LCG [8].

For the Buffer Status reporting procedure, the UE shall consider all radio bearers which are not suspended and may consider radio bearers which are suspended.

A Buffer Status Report (BSR) shall be triggered if any of the following events occur:
UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
UL resources are allocated and number of padding bits is equal to or larger than the size of the Buffer Status Report MAC control element plus its subheader, in which case the BSR is referred below to as "Padding BSR";
retxBSR-Timer expires and the UE has data available for transmission for any of the logical channels which belong to a LCG, in which case the BSR is referred below to as "Regular BSR";
periodicBSR-Timer expires, in which case the BSR is referred below to as "Periodic BSR".

For Regular and Periodic BSR:
if more than one LCG has data available for transmission in the TTI where the BSR is transmitted: report Long BSR;
else report Short BSR.

For Padding BSR:
if the number of padding bits is equal to or larger than the size of the Short BSR plus its subheader but smaller than the size of the Long BSR plus its subheader:
if more than one LCG has data available for transmission in the TTI where the BSR is transmitted: report Truncated BSR of the LCG with the highest priority logical channel with data available for transmission; else report Short BSR.

else if the number of padding bits is equal to or larger than the size of the Long BSR plus its subheader, report Long BSR.

If the Buffer Status reporting procedure determines that at least one BSR has been triggered and not cancelled:

if the UE has UL resources allocated for new transmission for this TTI:
instruct the Multiplexing and Assembly procedure to generate the BSR MAC control element(s);
start or restart periodicBSR-Timer except when all the generated BSRs are Truncated BSRs;
start or restart retxBSR-Timer.

else if a Regular BSR has been triggered:
if an uplink grant is not configured or the Regular BSR was not triggered due to data becoming available for transmission for a logical channel for which logical channel SR masking (logicalChannelSR-Mask) is setup by upper layers:
a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR. A Padding BSR is triggered for a specific MAC PDU only and the trigger is cancelled when this MAC PDU has been built.

[ . . . ]

6.1.2 MAC PDU (DL-SCH and UL-SCH Except Transparent MAC and Random Access Response, MCH)

Figure 6:
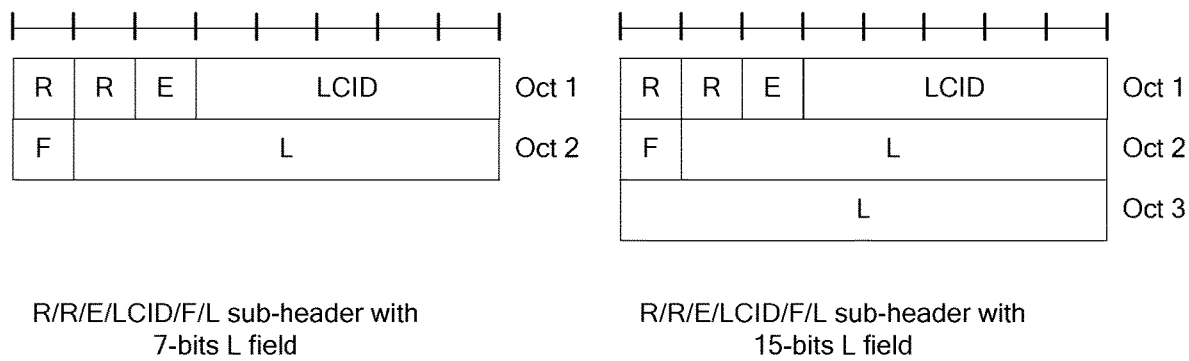
FIG. 6 is a reproduction of FIG. 6.1.2-1 of 3GPP TS 36.321 v11.2.0.

A MAC PDU consists of a MAC header, zero or more MAC Service Data Units (MAC SDU), zero, or more MAC control elements, and optionally padding; as described in FIG. 6.1.2-3.

Both the MAC header and the MAC SDUs are of variable sizes.

A MAC PDU header consists of one or more MAC PDU subheaders; each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

[FIG. 6.1.2-1 of 3GPP TS 36.321 v11.2.0 has been reproduced as FIG. 6.]

Figure 7:
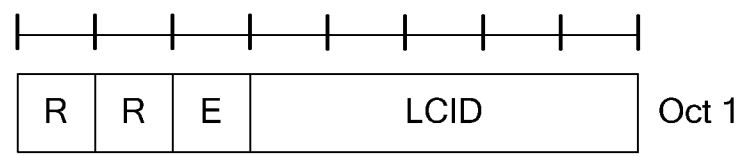
FIG. 7 is a reproduction of FIG. 6.1.2-2 of 3GPP TS 36.321 v11.2.0.

[FIG. 6.1.2-2 of 3GPP TS 36.321 v11.2.0 has been reproduced as FIG. 7.]

MAC PDU subheaders have the same order as the corresponding MAC SDUs, MAC control elements and padding.

MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader.

A maximum of one MAC PDU can be transmitted per TB per UE. A maximum of one MCH MAC PDU can be transmitted per TTI.

Figure 8:
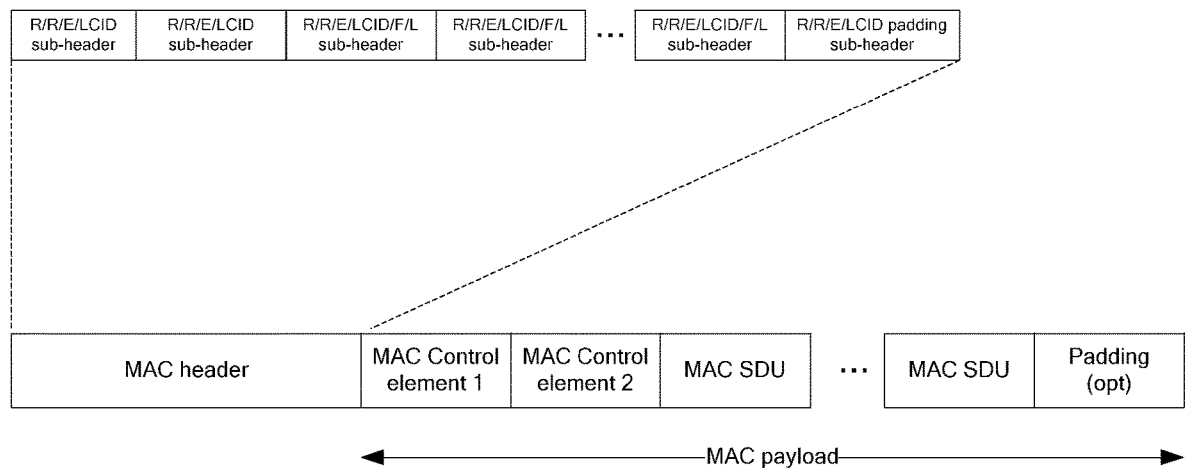
FIG. 8 is a reproduction of FIG. 6.1.2-3 of 3GPP TS 36.321 v11.2.0.

[FIG. 6.1.2-3 of 3GPP TS 36.321 v11.2.0 has been Reproduced as FIG. 8.]

6.1.3 MAC Control Elements 6.1.3.1 Buffer Status Report MAC Control Elements

Buffer Status Report (BSR) MAC control elements consist of either:

Short BSR and Truncated BSR format: one LCG ID field and one corresponding Buffer Size field (FIG. 6.1.3.1-1); or Long BSR format: four Buffer Size fields, corresponding to LCG IDs #0 through #3 (FIG. 6.1.3.1-2).

The BSR formats are identified by MAC PDU subheaders with LCIDs as specified in table 6.2.1-2.

The fields LCG ID and Buffer Size are defined as follow:

LCG ID: The Logical Channel Group ID field identifies the group of logical channel(s) which buffer status is being reported. The length of the field is 2 bits;

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. If extendedBSR-Sizes is not configured, the values taken by the Buffer Size field are shown in Table 6.1.3.1-1. If extendedBSR-Sizes is configured, the values taken by the Buffer Size field are shown in Table 6.1.3.1-2.

Figure 9:
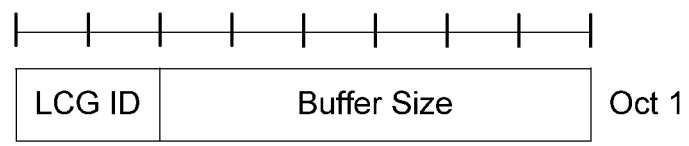
FIG. 9 is a reproduction of FIG. 6.1.3-1 of 3GPP TS 36.321 v11.2.0.

[FIG. 6.1.3-1 of 3GPP TS 36.321 v11.2.0 has been reproduced as FIG. 9.]

Figure 10:
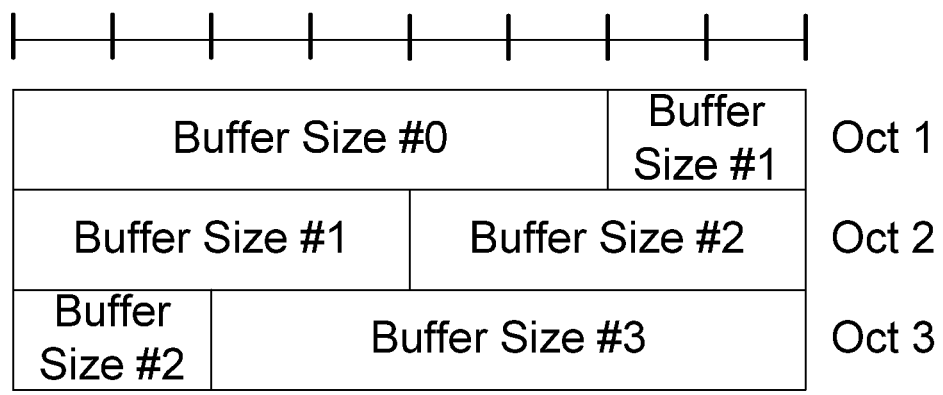
FIG. 10 is a reproduction of FIG. 6.1.3-2 of 3GPP TS 36.321 v11.2.0.

[FIG. 6.1.3-2 of 3GPP TS 36.321 v11.2.0 has been reproduced as FIG. 10.]

[ . . . ]

6.2.1 MAC header for DL-SCH, UL-SCH and MCH

The MAC header is of variable size and consists of the following fields:

LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits;

L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field;

F: The Format field indicates the size of the Length field as indicated in table 6.2.1-3. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1;

E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte;

R: Reserved bit, set to "0".

The MAC header and subheaders are octet aligned.

TABLE 6.2.1-2

Values of LCID for UL-SCH

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Furthermore, 3GPP R1-143590 states:

Agreement:
  PUSCH like hopping is used for D2D Data
  Both Type 1 PUSCH hopping and Type 2 PUSCH hopping are supported for D2D data
    Type 2 PUSCH hopping for D2D data uses a hopping ID that is configured with the SA resource pool configuration
  For Mode 2 data, the hopping only applies to the resources configured in the resource pool Agreement:
  The following working assumptions on T-RPT are confirmed:
    T-RPT in the SA indicates:
      Transmission interval(s) between transmission of multiple MAC PDUs
      Resources for transmission of each MAC PDU Agreement:
  The only possible value of the number of transmissions of a given D2D communication MAC PDU is 4.

Each transmission takes place in one subframe.
  FFS whether any special behaviour is needed for TDD configurations that do not support 4 transmissions.
  Proposed Working Assumption:
    The T-RPT in SA comprises an index to a pattern
    The pattern associated with each index is preconfigured, and may be reconfigured by RRC, using a bitmap
      Aim to restrict the number of valid patterns to 256
        Thomas to make a proposal on which 256 patterns are valid after agreement on the valid length(s) of the bitmap—R1-143450
      Length of the bitmap corresponds to the number of D2D subframes in a repetition cycle of the resource pool
        FFS on what lengths and how many lengths are supported
      Starting from the beginning of the bitmap, the first four 1's correspond to the first MAC PDU, the next four 1's correspond to the next MAC PDU, etc
        Note that the 1's do not have to be contiguous
      For mode 1, the subframes referenced by the pattern are contiguous D2D subframes
      FFS whether the pattern can repeat; if so, the number of repetitions would be signalled in SA
  Companies are encouraged to check the details of this proposal and work together to refine it.
  Stefano to make a proposal on the length(s) of the bitmap for configuring the T-RPT indices—R1-143452 (merged into 3450).
  Check the status on Wednesday afternoon after coffee break.
  Companies are encouraged to check 3450 carefully and provide feedback to Thomas, aiming to reach agreement by Thur.
  Revisit on Thursday afternoon—R1-143456.

Agreement:
  As per R1-143456, with:
    Addition of patterns with k=1
    For mode 2, patterns with k=N are not supported Agreement:
  Mode 1 D2D timing is always the same as the WAN PUSCH timing Agreement:
  The TA value signaled via SA is the value closest to $N_{TA}$ not more than 4 ms before the start of the first transmission of the SA message.

Agreements:
  The L1 SA design is a single design for unicast/groupcast/broadcast
  The ID is signalled explicitly in the payload
  Directly using the ID provided by RAN2
  Number of bits: 8

Agreements:
  Frequency resource is indicated by Rel-8 UL Type 0 resource allocation (5-13 bits depending on System BW)
  1 bit frequency hopping indicator (as per Rel-8)
    Note that some reinterpretation of the indexing is to be defined so that hopping does not use PRBs outside the configured resource pool for mode 2.
  Note that only single-cluster resource allocations are valid
    this implies that if there are gaps in the resource pool in the frequency domain, a resource allocation shall not straddle a gap
  No RV indicator in SA
  RV pattern for data: {0, 2, 3, 1}

Already agreed:
  MCS (5 bits)
  T-RPT (7 bits)
  TA (6 bits)
  ID (8 bits)
Agreement:
  No other fields in SA (unless resource reservation announcement is agreed)
Agreements:
  Number of transmissions: Always 2
  Both transmissions use RV0
Proposal:
  SA hopping is defined by
    Time: second_nt=mod(first_nf+first_nt, Nt)+Nt
    Frequency: second_nf=mod(first_nf+ceil(Nf/2), Nf)
  Where
    first_nt refers to time index of the first transmission within SA period: first_nt is between 0 and Nt−1
    first_nf refers to frequency index of the first transmission within SA period
    second_nt refers to time index of the second transmission within SA period:
    second_nt is between Nt and 2*Nt−1
    second_nf refers to frequency index of the second transmission within SA period
    Nt refers to the total number SA resources in time divided by 2 within a SA period
      Number of SA sub-frames within a SA period is proposed to be an even value
    Nf refers to the total number SA resources in frequency
    Hopping is defined with respect to an SA receiver resource pool
Agreement Including the Marked Changes:
  Resource size for SA is 1 PRB pair
  In a given subframe, the maximum supported size of the combined SA resource pools (i.e. the sum of the mode 1 and mode 2 SA resource pools) is 50
  No search space is defined within the SA resource pool.
Agreement:
  A discovery resource consists of 2 contiguous PRB in frequency
  This is applicable to both normal and extended CP
Agreement:
  For Mode-2 communication and associated SA:
    For transmission in a given scheduling period (i.e. including SA and data transmission), the UE selects a resource with equal probability from the available resources for the first transmission of SA,
      Alt 0: No further details of the selection algorithm are specified in RAN1 specs
      FFS:1 bit resource reservation announcement is included in SA to indicate that the resource is reserved in the next scheduling period, and the above selection avoids resources for which the UE has received a reservation announcement relating to this scheduling period.
        Proponents to provide full details of 1-bit resource reservation by 6:59 pm—R1-143446.
        Revisit on Wed.
Proposal:
  In the current scheduling period, 1 bit resource reservation announcement is included in SA to indicate that the resource is reserved in the next scheduling period
  Scheduling period is N SA periods (with N>=2)
  UE will not transmit in the next scheduling period on resources for which reservations by other UEs are detected on the other N−1 SA periods during at least the current scheduling period
  Observation: The above selection avoids resources for which the UE has received a reservation announcement relating to this scheduling period
  No consensus.
Agreements:
  For mode 2:
    The data T-RPT cannot be uniquely identified from knowledge of the corresponding SA resource
      i.e. the transmitting UE may select T-RPT for data independently from the SA resource selection, with equal probability out of the available and relevant T-RPTs, or
    Note that the transmission interval between transmission of multiple MAC PDUs and the number of transmissions of a given MAC PDU are not part of the T-RPT selection process.
Agreement:
  For Mode 2:
    The transmitting UE may select the data frequency resource with equal probability out of the frequency resources that can be signalled by the SA
    Note that the size of the frequency resource for the data transmission is not part of the above equal-probability selection process.
Agreement:
  Transmission and reception resource pool for SA, Discovery, and Mode 2 data of a cell is indicated using subframeBitmap:
    1 indicates subframe with D2D resources
    0 indicates subframe with no D2D resources
    offsetIndicatorInitialization: Offset indicator used to determine the start of a resource pool
      The indicator is from SFN 0 of FFS between
        Serving cell or neighboring cells
        Only serving cell
      Granularity of 1 sub-frame
      RAN2 can choose to signal this parameter using 2 offsets
        The granularity of one of the two offsets does not need to be 1 subframe
    prbLength: length of a D2D allocation in PRB
      Does not represent the total D2D allocation in a sub-frame
    startPRB: D2D transmissions on a subframe can occur on PRB index greater than or equal to this value and less than startPRB+prbLength
    endPRB: D2D transmissions on a subframe can occur on the PRB index lesser than or equal to this value and greater than endPRB-prbLength
  Subframe bitmap details:
    For FDD, subframeBitmap refers to contiguous set of uplink subframes.
    For TDD, subframeBitmap refers to contiguous uplink sub-frames of a TDD configuration
      TDD configurations that the UEs are to assume for the neighboring cells are signalled
    FDD: subframe bitmap length is 40
    TDD (Working Assumption, to be checked until Friday):
      config 1-5: subframe bitmap length is twice the number of uplink sub-frames within a radio frame
      config 6: subframe bitmap length is 30
      config 0: subframe bitmap length is 42

FFS whether any limitations are applied to the subframe bitmaps (e.g., limitations to the number of used subframes in the subframe bitmap)

FFS in RAN2 the details on how the subframe bitmaps and pools are signaled

FFS if the pre-configured pools are FDD or TDD, and how this is signaled, if needed Data Pool details as on slides 4, 5 and 6 in R1-143455, with the following changes:

change of footnote on slide 6 to "*subframeBitmap is repeated numRepetition times within each discovery period".

| numRepetition | {1, . . . , 5} for FDD, |
| | {1, . . . , 8} for TDD config. 1 to 5, |
| | {1, . . . , 4} for TDD config. 0, |
| | {1, . . . , 5} for TDD config. 6 |

Values of numRepetition for TDD are a Working Assumption, to be checked until Friday On slides 2, 4, 5 and 6: offsetIndicator
FFS how to interpret offsetIndicator, e.g. whether it directly indicates an offset or whether it is an input to a function to derive an offset.

On slides 2, 4, 5, 6: change prbLength->numPRBs

Stefano to provide update according to the above in R1-143570.

Agreement:
From the UE perspective, at any given time instant, up to 4 discovery transmission pools can be independently configured, each of which may be configured for either of the discovery types Agreement:
From the UE perspective, at any given time instant, up to 4 mode 2 SA transmission pools can be available for selection at L1

From the UE perspective, at any given time instant, up to 4 mode 2 data transmission pools can be available for selection at L1

Note that there is a 1:1 association between an SA pool and a data pool, which is (pre-) configured for the receiver.

The UE shall not expect to be (pre-)configured with SA pools which overlap.

Agreement:
Padding: Size of D2D DCI is matched to size of DCI-0 that the UE is configured with by padding '0'

Agreement:
D2D Grant does not contain an MCS field
MCS can (depending on eNB implementation) be configured by eNB by RRC
details of RRC signalling are up to RAN2
If not currently configured by eNB, MCS selection is up to UE implementation Agreement:

| | 1.4 MHz | 20 MHz |
|---|---|---|
| Hopping flag | 1 | 1 |
| Data RB allocation | 5 | 13 |
| T-RPT index | 7 | 7 |
| SA resource index | 6 | 6 |
| TPC | 1 | 1 |
| TOTAL: | 20 | 28 |
| Rel-8 Format 0 | 21 | 28 |

(with obvious interpolation to the other bandwidths)

SA resource index is an index into the SA resource pool and indicates both time and frequency dimensions.
FFS whether the mapping of the indices to the pool is fixed in the specification or configured by higher layer signalling
Details FFS TPC bit switches between maximum available power and open-loop power control T-RPT index is 7 bits in both D2D Grant and SA for both Mode 1 and Mode 2

Mode 1 grant refers to the next instance of SA resource pool that starts at least 4 ms after the subframe on which the Mode 1 grant is transmitted Revisit CIF after discussion on multicarrier operation.

Candidates considered for removal:
2 T-RPT bits
Sharp, LG, NEC
SA resource allocation
Pana, Sharp,
MCS:
All: HW, HiSi, QC, GDB, MS, ZTE, Samsung, EH///
Configured by higher layers or left to UE implementation
Remove 2 bits: Fujitsu
Remove 1 bit: Sharp Agreement (Including Marked Changes):
The hopping pattern for first transmission within a Type 2B discovery period is:
Time: next_nt=mod(c*nf+nt*Nf+a, Nt)
Frequency: next_nf=mod(floor((nf+nt*Nf)/Nt)+b, Nf)
Here
nt refers to logical time index of the first transmission within a discovery period
nf refers to logical frequency index of the first transmission within a discovery period
Nt refers to the total number discovery resources in time divided by the number total transmissions within a discovery period
Nf refers to the total number discovery resources in frequency
c is RRC configured from a set of values that are positive and at least include 1
a is cell specific and b' UE specific, and both are RRC configured
Any means to identify which parameter value should be used at any given time instant are up to RAN2
b=mod (b'+#discovery periods since b' was received, M), here
b' indicates an index of the upcoming discovery period, when allocating a UE the Type 2B discover resource
b is between 0 and M−1
M is fixed in specification
Working assumption to be checked until RAN1#78bis (including whether a single value of M is sufficient): M=10
The hopping formula applies only to hopping across discovery periods
At least joint time and frequency hopping is supported across discovery periods
FFS whether only time hopping is used and can be configured
FFS whether only frequency hopping is used and can be configured if retransmissions within a discovery period are configured Agreement:
  In D2D WI in Rel-12, no change in 36.213 to PC for cellular UL transmissions compared to Rel-11
Agreements:
  For PD2DSS,
    Sequence:
      New root indices
        FFS: Detailed root indices
    Waveform:
      SC-FDM without DFT-precoding
    Number of symbols in a subframe is 2
  For SD2DSS,
    Sequence:
      Same sequence as Rel-8 SSS
    Waveform:
      SC-FDM without DFT-precoding with reduced power with respect to PD2DSS
        FFS: how to specify reduced power mechanism for SD2DSS
    Number of symbols in a subframe is 2
  For reception, in-coverage UEs may need D2DSS from another in-coverage UEs for time/freq. synchronization in some inter-cell scenarios
  Within a subframe, D2DSS symbol location is fixed for a given CP length
  For PD2DSCH,
    Only transmitted from synchronization source
    QPSK modulation
    TBCC
    16bits CRC
    Message scrambling sequence is derived from PSSID
    Multiplexed in the same PRBs with D2DSS
      FFS: Symbols used only for D2DSS and PD2DSCH within a subframe Assuming it is possible to have some remaining transmission opportunities in the current SA (Scheduling Assignment)/Data Cycle after some D2D transmissions in the cycle, the UE may need to consider (if possible) (i) how to use the transmission opportunities, or (ii) whether to send a Scheduling Assignment in the subsequent SA period and then be able to send the D2D data and/or the ProSe BSR through the resources associated with the subsequent SA period. The latency of transmitting the D2D data and transmission robustness between transmitter and receiver might need to be studied, especially for some services like urgent data or VoIP.

The general concept of the invention is that UE needs to determine whether to send BSR and/or SR based on the available resources which have been allocated before the determination. More specifically, if D2D data arrives or ProSe BSR is triggered, UE would check if there are any available (whether sufficient or not) transmission opportunities/D2D grants in the current or the subsequent SA/Data Cycle), and would determine whether to trigger ProSe BSR or to cancel (or not send) the triggered ProSe BSR, or whether to send a scheduling request for D2D grant.

Figure 11:
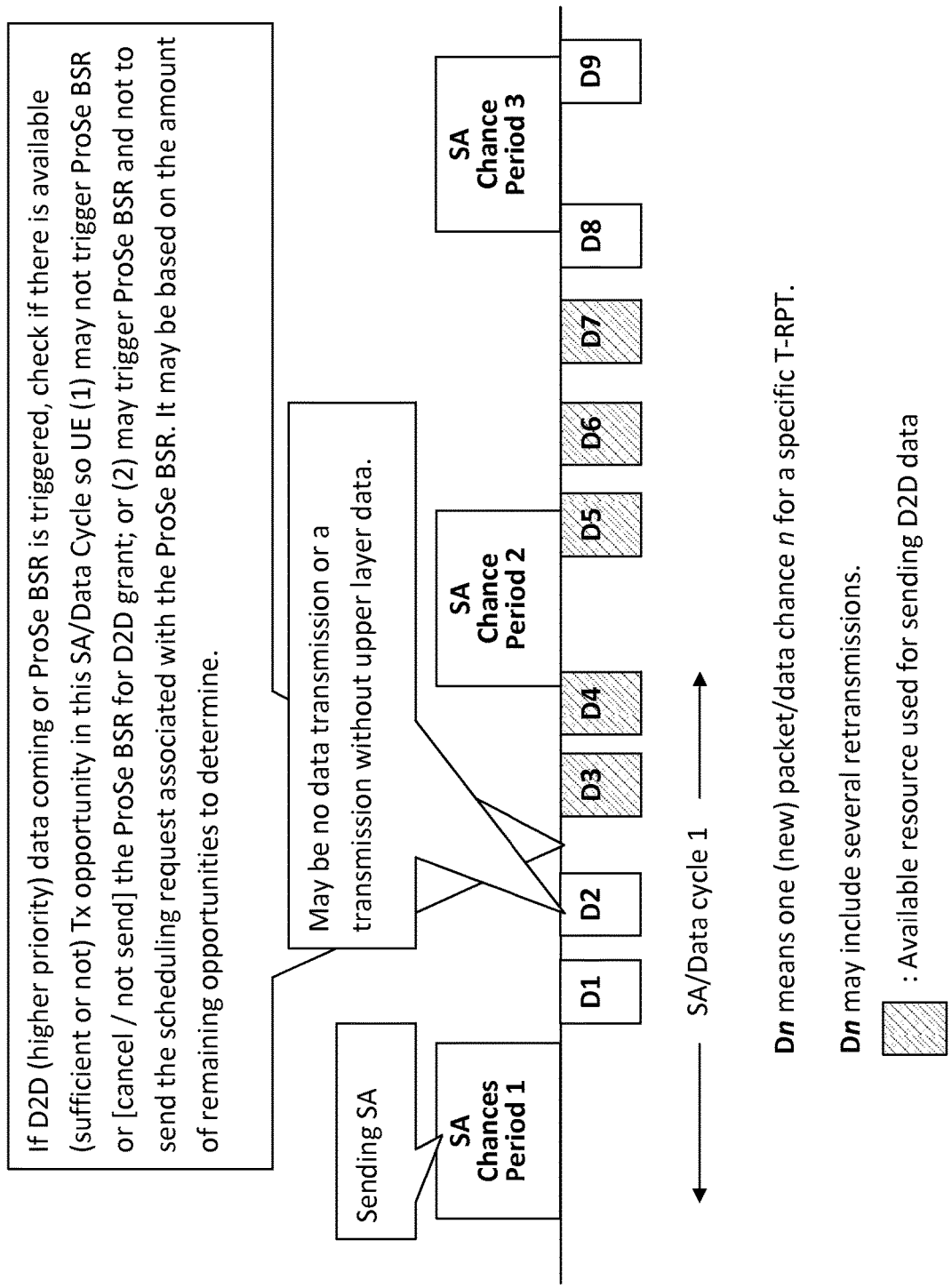
FIG. 11 is a diagram according to one exemplary embodiment.

In an example illustrated in FIG. 11, if new or higher priority D2D data arrives between the timing of D2 and D3 in (as shown in FIG. 11), the UE may not send the ProSe BSR to the base station if the data can be sent through D3 and/or D4, or even D5~D7. If the D2D grant has been allocated previously by the base station and not yet used by the UE then UE may not trigger Scheduling Request for the new D2D data.

The general concept or idea can be applied to both mode 1 (contention based) and mode 2 (non-contention based). Mode 1 means the UE needs to by itself select SA (randomly or following some specific rule) and derives the D2D resource associated with the SA. Mode 2 means the UE should send a request to base station, and the base station can then schedule D2D resource for the UE.

Figure 12:
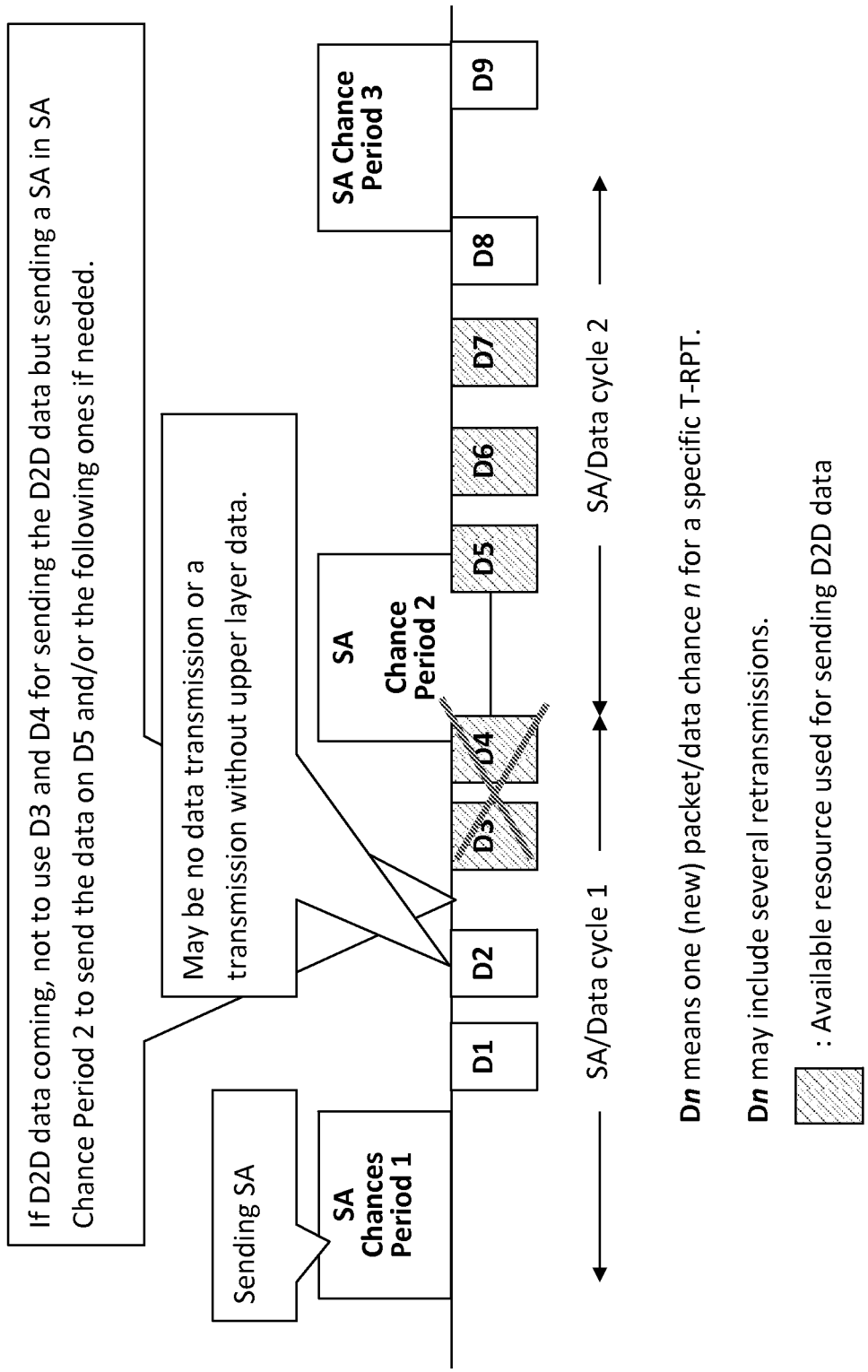
FIG. 12 is a diagram according to one exemplary embodiment.

In an alternative example illustrated in FIG. 12, the UE could skip D3/D4 of SA/Data Cycle 1 and could send a SA in the next SA period to send the data in the SA/Data Cycle 2. ProSe BSR or information of amount of D2D data could be sent by a first UE to the network or to a second UE (i.e., buffer status could be also sent between two different UEs except for between UE and network) since it might be also beneficial for the second UE to know how much data will be transmitted roughly in advance by the first UE.

Figure 13:
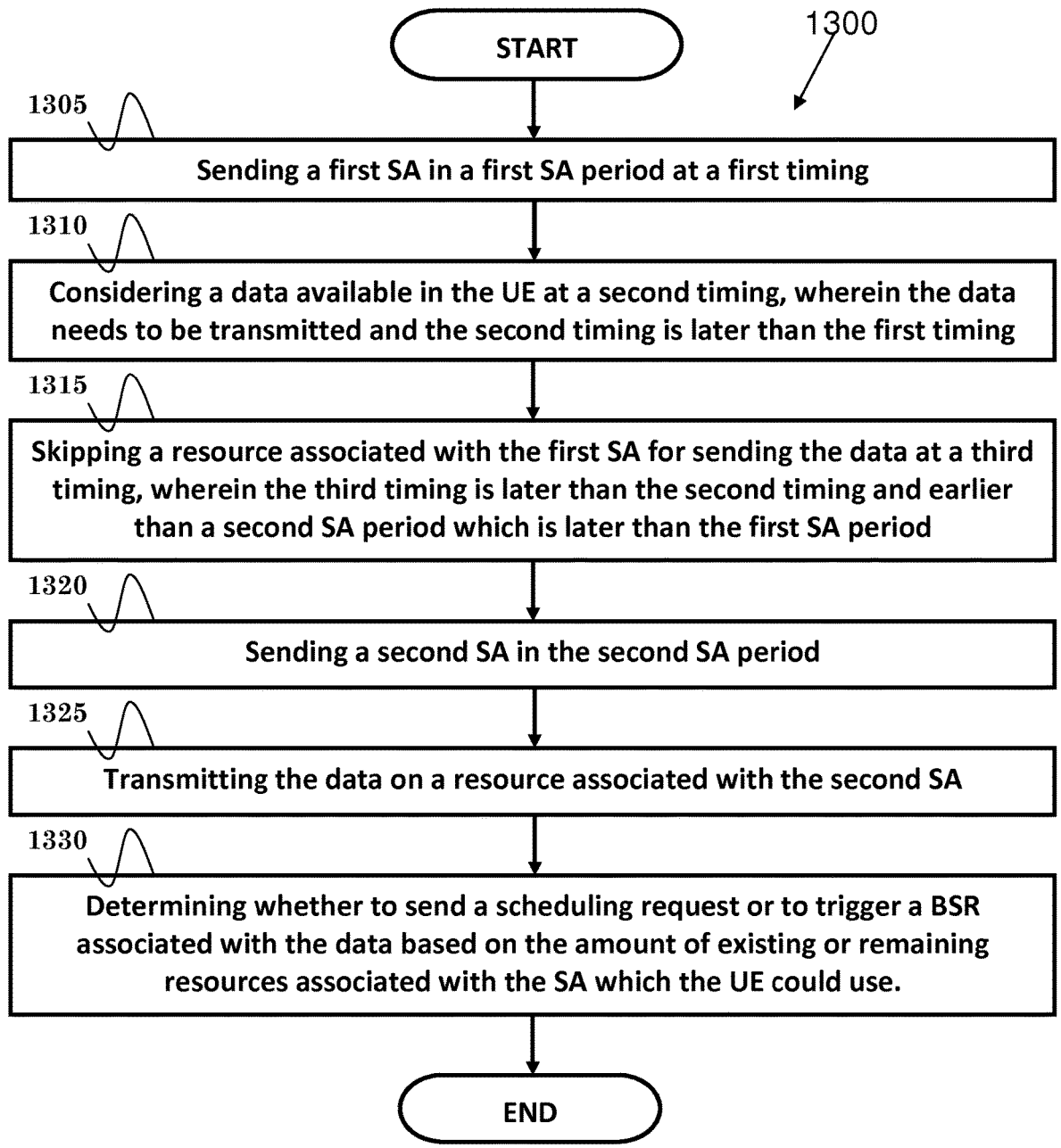
FIG. 13 is a flow chart according to one exemplary embodiment.

FIG. 13 is a flow chart 1300 in accordance with one exemplary embodiment from the perspective of a UE. In step 1305, the UE sends a first scheduling assignment (SA) in a first SA period at a first timing. In step 1310, the UE considers a data available in the UE at a second timing, wherein the data needs to be transmitted and the second timing is later than the first timing. In step 1315, the UE skips a resource associated with the first SA for sending the data at a third timing, wherein the third timing is later than the second timing and earlier than a second SA period which is later than the first SA period.

In one embodiment, the first SA and the second SA are associated with a plurality of resources in a SA/Data Cycle. Furthermore, the plurality of resources could be associated with a T-RPT (Time Resource Pattern for Transmission).

In step 1320, the UE sends a second SA in the second SA period. In step 1325, the UE transmits or sends the data on a resource associated with the second SA. In one embodiment, the data could include control information (such as a BSR) and/or data information (such as upper layer data on the UE side).

In step 1330, the UE determines whether to send a scheduling request or to trigger a BSR associated with the data based on the amount of existing or remaining resources associated with the SA which the UE could use. In one embodiment, the UE does not trigger the BSR associated with the data. Alternatively, the UE triggers the BSR associated with the data. However, the UE does not send to a base station (BS) the scheduling request (SR) associated with the triggered BSR.

In general, the final UE behavior does not send a SR since the remaining resources are sufficient to carry all remaining buffered data. Since a triggered BSR could trigger a SR, it is then foreseen not to send the triggered SR to request an UL grant for sending the triggered BSR. Normally, when a BSR is triggered due to higher priority data arrival or data available from empty to non-empty or some other specific case, the UE would need to send the SR, which is triggered by the BSR, to request an UL grant, and UE would use the UL grant for sending the BSR. However, in this special case, nothing will happen.

Referring back to FIGS. 3 and 4, the device 300 includes a program code 312 stored in memory 310 of a UE. The CPU 308 could execute program code 312 to enable the UE to (i) send a first SA in a first SA period at a first timing, (ii) consider a data available in the UE at a second timing, wherein the data needs to be transmitted and the second timing is later than the first timing, (iii) skip a resource associated with the first SA for sending the data at a third timing, wherein the third timing is later than the second timing and earlier than a second SA period which is later than the first SA period, (iv) send a second SA in the second SA period, and (v) transmit or send the data on a resource associated with the second SA.

In one embodiment, the CPU could further execute program code 312 to enable the UE to determine whether to send a scheduling request or to trigger a BSR associated with the data based on the amount of existing or remaining resources associated with a SA which the UE could use. In one embodiment, the UE does not trigger the BSR associated with the data. Alternatively, the UE triggers the BSR associated with the data. However, the UE does not send to a base station the scheduling request (SR) associated with the triggered BSR.

In addition, the CPU 308 could execute the program code 312 to perform all of the above-described actions and steps or others described herein.

Figure 14:
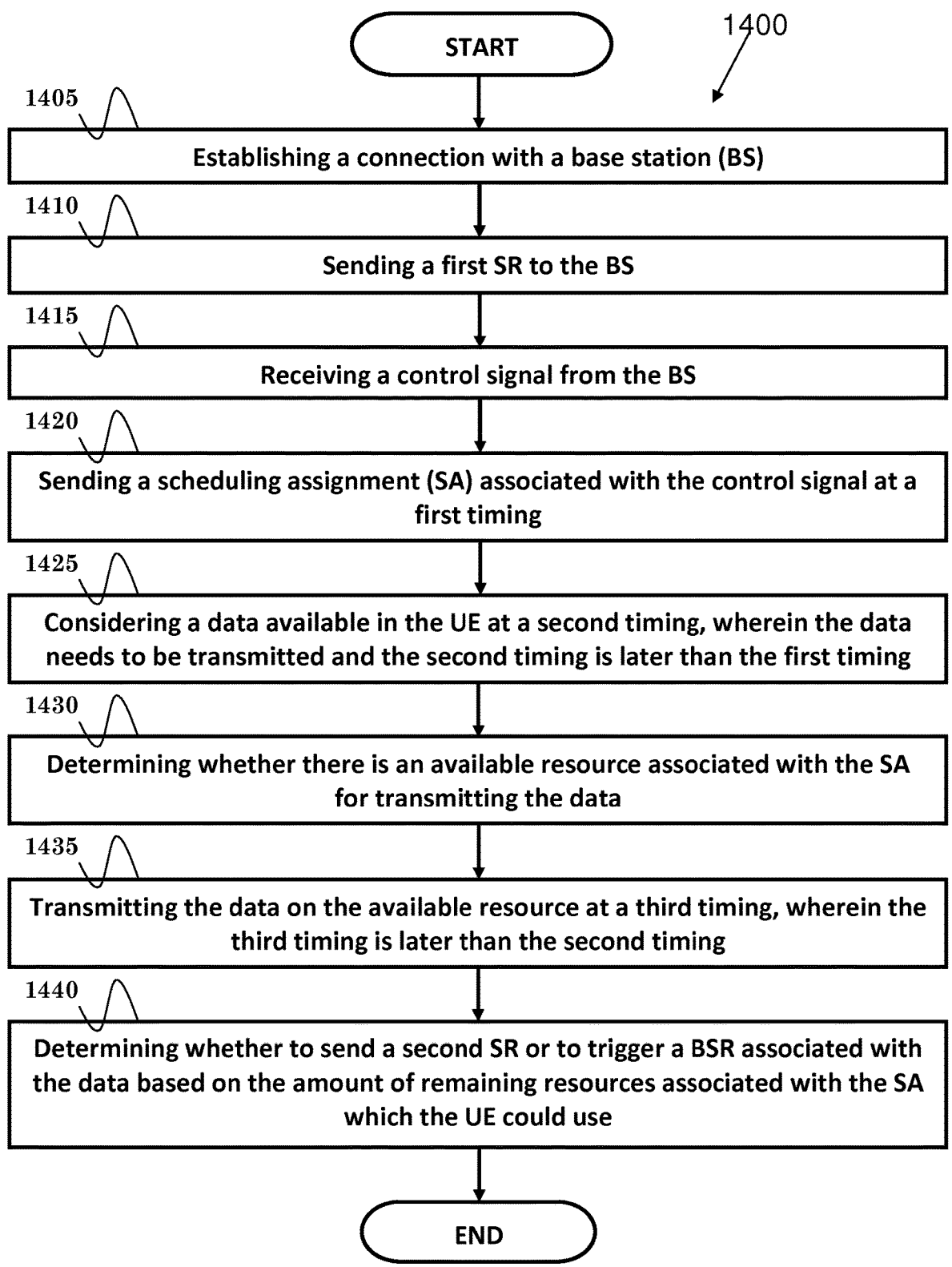
FIG. 14 is a flow chart according to one exemplary embodiment.

FIG. 14 is a flow chart 1400 in accordance with one exemplary embodiment from the perspective of a UE. In step 1405, the UE establishes a connection with a BS. In step 1410, the UE sends a first scheduling request to the BS. In step 1415, the UE receives a control signal from the BS. In step 1420, the UE sends a SA associated with the control signal at a first timing. In step 1425, the UE considers a data available in the UE at a second timing, wherein the data needs to be transmitted and the second timing is later than the first timing. In step 1430, the UE determines whether there is an available resource associated with the SA for transmitting the data.

In one embodiment, the SA is associated with a plurality of resources in a SA/Data Cycle. Furthermore, the plurality of resources could be associated with a T-RPT.

In step 1435, the UE transmits or sends the data on the available resource at a third timing, wherein the third timing is later than the second timing. In one embodiment, the data could include control information (such as a BSR) and/or data information (such as upper layer data in the UE side).

In step 1440, the UE determines whether to send a second scheduling request or to trigger a BSR associated with the data based on the amount of existing or remaining resources associated with the SA which the UE could use. In one embodiment, the UE does not trigger the BSR associated with the data. Alternatively, the UE triggers the BSR associated with the data. However, the UE does not send to the base station the second SR associated with the triggered BSR since the amount of remaining resources associated with the SA can accommodate the data to result in BSR cancellation.

In general, the final UE behavior does not send a SR since the remaining resources are sufficient to carry all remaining buffered data. Since a triggered BSR could trigger a SR, it is foreseen not to send the triggered SR to request an UL grant for sending the triggered BSR. Normally, when a BSR is triggered due to higher priority data arrival or data available from empty to non-empty or some other specific case, UE would need to send the SR, which is triggered by the BSR, to request an UL grant, and UE would use the UL grant for sending the BSR. However, in this special case, nothing will happen.

Referring back to FIGS. 3 and 4, the device 300 includes a program code 312 stored in memory 310 of a UE. In one embodiment, the CPU 308 could execute program code 312 to enable the UE to (i) establish a connection with a BS, (ii) send a first scheduling request to the BS, (iii) receive a control signal from the BS, (iv) sending a SA associated with the control signal at a first timing, (v) consider a data available in the UE at a second timing, wherein the data needs to be transmitted and the second timing is later than the first timing, (vi) determine whether there is an available resource associated with the SA for transmitting the data, and (vii) transmit or send the data on the available resource at a third timing, wherein the third timing is later than the second timing.

In one embodiment, the CPU could further execute program code 312 to enable the UE to determine whether to send a second scheduling request or to trigger a BSR associated with the data based on the amount of existing or remaining resources associated with the SA which the UE could use. In one embodiment, the UE does not trigger the BSR associated with the data. Alternatively, the UE triggers the BSR associated with the data. However, the UE does not send to a base station the second scheduling request (SR) associated with the triggered BSR since the amount of remaining resources associated with the SA can accommodate the data to result in BSR cancellation.

In addition, the CPU 308 could execute the program code 312 to perform all of the above-described actions and steps or others described herein.

Figure 15:
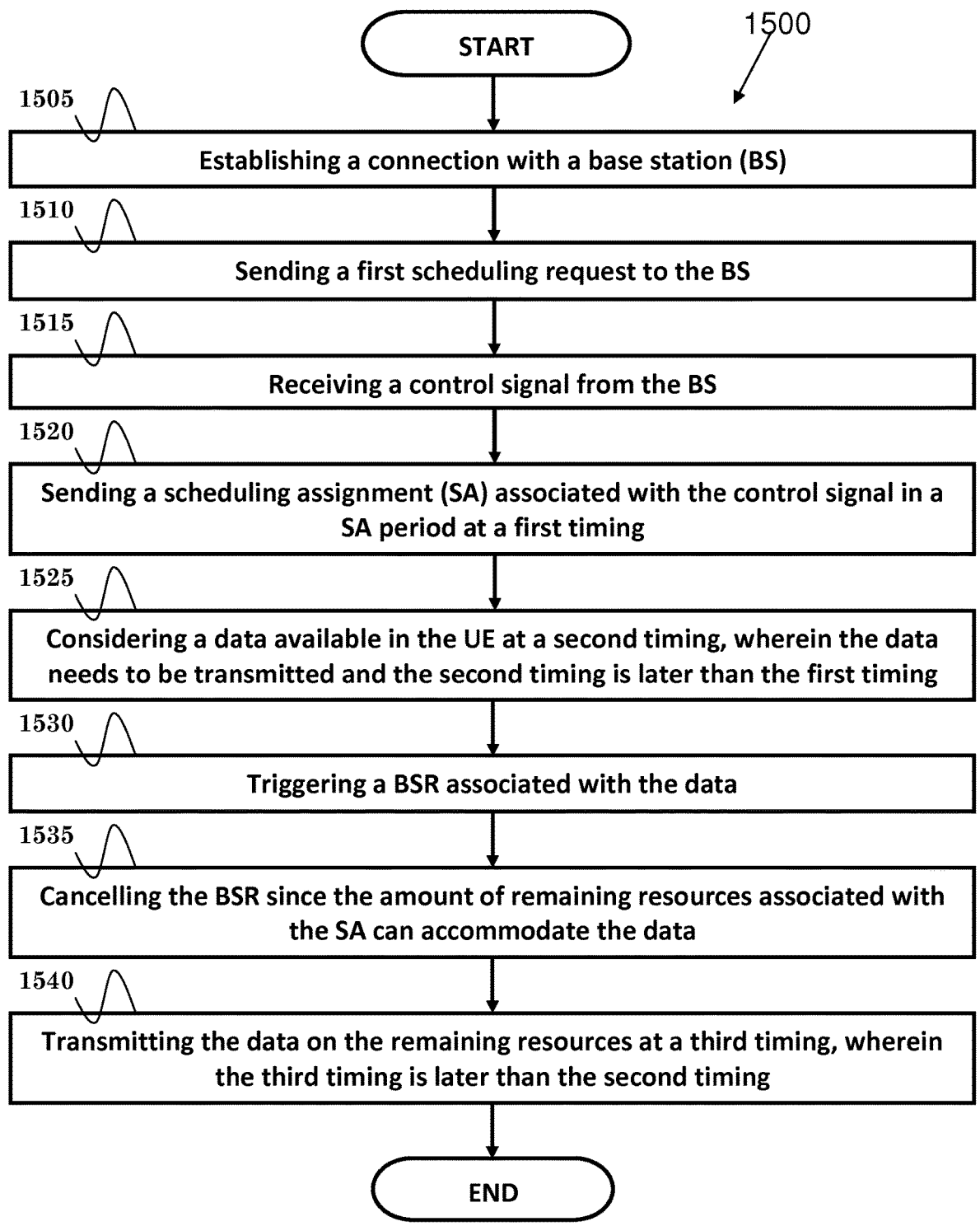
FIG. 15 is a flow chart according to one exemplary embodiment.

FIG. 15 is a flow chart 1500 in accordance with one exemplary embodiment from the perspective of a UE. In step 1505, the UE establishes a connection with a base station. In step 1510, the UE sends a first scheduling request to the BS. In step 1515, the UE receives a control signal from the BS. In step 1520, the UE sends a SA associated with the control signal in a SA period at a first timing. In one embodiment, the SA is associated with a plurality of resources in a SA/Data Cycle. Furthermore, the plurality of resources could be associated with a T-RPT.

In step 1525, the UE considers a data available in the UE at a second timing, wherein the data needs to be transmitted and the second timing is later than the first timing. In one embodiment, the data could include control information (such as a BSR) and/or data information (such as upper layer data in the UE side).

In step 1530, the UE triggers a BSR associated with the data. In step 1535, the UE cancels the BSR since the amount of remaining resources associated with the SA can accommodate the data. In step 1540, the UE transmits the data on the remaining resources at a third timing, wherein the third timing is later than the second timing.

In general, the final UE behavior does not send a SR since the remaining resources are sufficient to carry all remaining buffered data. Since a triggered BSR could trigger SR, it is foreseen to cancel the BSR that has just been triggered. Then no SR would be triggered. As shown in steps 1530 and 1535, a BSR is triggered and then intentionally cancelled so that the UE would not send any SR for requesting an UL grant for sending any BSR. Normally, when a BSR is triggered due to higher priority data arrival or data available from empty to non-empty or some other specific case, the UE would need to send SR, which is triggered by the BSR, to request an UL grant, and UE would use the UL grant for sending the BSR. However, in this special case, nothing will happen.

In one embodiment, the UE determines whether to send a second scheduling request or to trigger a BSR associated with the data based on the amount of existing or remaining resources associated with the SA which the UE could use. In one embodiment, the UE does not trigger the BSR associated with the data. Alternatively, the UE triggers the BSR associated with the data. However, the UE does not send to the base station the second SR associated with the triggered BSR since the amount of remaining resources associated with the SA can accommodate the data to result in BSR cancellation.

In general, the final UE behavior does not send a SR since the remaining resources are sufficient to carry all remaining buffered data. Since a triggered BSR could trigger SR, it is foreseen not to send the triggered SR to request an UL grant for sending the triggered BSR. Normally, when a BSR is triggered due to higher priority data arrival or data available from empty to non-empty or some other specific case, the UE would need to send a SR, which is triggered by the BSR, to request an UL grant, and UE would use the UL grant for sending the BSR. However, in this special case, nothing will happen.

Referring back to FIGS. 3 and 4, the device 300 includes a program code 312 stored in memory 310 of a UE. In one embodiment, the CPU 308 could execute program code 312 to enable the UE to (i) establish a connection with a BS, (ii) send a first scheduling request to the BS, (iii) receive a control signal from the BS, (iv) sending a SA associated with the control signal in a SA period at a first timing, (v) consider a data available at a second timing, wherein the data needs to be transmitted and the second timing is later than the first timing, (vi) triggers a BSR associated with the data, (vii) cancel the BSR since the amount of remaining resources associated with the SA can accommodate the data, and (viii) transmit or send the data on the remaining resources at a third timing, wherein the third timing is later than the second timing.

In one embodiment, the CPU could further execute program code 312 to enable the UE to determine whether to send a second scheduling request or to trigger a BSR associated with the data based on the amount of existing or remaining resources associated with the SA which the UE could use. In one embodiment, the UE does not trigger the BSR associated with the data. Alternatively, the UE triggers the BSR associated with the data. However, the UE does not send to a base station the second scheduling request (SR) associated with the triggered BSR since the amount of remaining resources associated with the SA can accommodate the data to result in BSR cancellation.

In addition, the CPU 308 could execute the program code 312 to perform all of the above-described actions and steps or others described herein.

In the above embodiments, the control signal from the BS could be a D2D grant received on PDCCH in the physical layer. The D2D grant informs the UE which time and frequency resource the UE should send the SA (scheduling assignment) and D2D data in a specific SA/Data cycle. Furthermore, the control information could be a BSR (Buffer Status Report) Control Element in the MAC layer.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE) to request resources in a wireless communication system, comprising:
   sending a first scheduling assignment (SA) for device to device (D2D) communication to a second UE at a first timing in a first SA period, wherein after some transmission opportunities associated with the first SA are used for D2D transmissions, there are remaining transmission opportunities in the first SA period;
   considering a new D2D data available in the first UE at a second timing in the first SA period, wherein the new D2D data needs to be transmitted and the second timing is later than the first timing;
   determining whether to use the remaining transmission opportunities in the first SA period to transmit the new D2D data;
   skipping and not use a resource associated with the first SA for transmitting the new D2D data at a third timing in the first SA period, wherein the third timing is later than the second timing;
   sending a second SA to the second UE in a second SA period, wherein the second SA period is later than the first SA period; and
   transmitting the new D2D data to the second UE on a resource associated with the second SA.

2. The method of claim 1, the new D2D data includes control information and/or data information.

3. The method of claim 1, wherein the first SA and the second SA are associated with a plurality of resources in a SA/Data Cycle.

4. The method of claim 3, wherein the plurality of resources are associated with a T-RPT (Time Resource Pattern for Transmission).

5. The method of claim 1, further comprises:
   determining whether to send a scheduling request (SR) or to trigger a BSR (Buffer Status Report) associated with the new D2D data based on the amount of existing or remaining resources associated with the SA which the first UE could use.

6. The method of claim 5, further comprises:
   not triggering the BSR associated with the new D2D data.

7. The method of claim 5, further comprises:
   triggering the BSR associated with the new D2D data and not sending a base station (BS) the SR associated with the triggered BSR.

8. A method for a first User Equipment (UE) to request resources in a wireless communication system, comprising:
   establishing a connection with a base station (BS);
   sending a first scheduling request (SR) to the BS;
   receiving a control signal from the BS;
   sending a scheduling assignment (SA) for device to device (D2D) communication to a second UE associated with the control signal at a first timing in a SA period, wherein after some transmission opportunities associated with the SA are used for D2D transmissions, there are remaining transmission opportunities in the SA period;
   considering a new D2D data available in the first UE at a second timing, wherein the new D2D data needs to be transmitted and the second timing is later than the first timing;
   determining whether to use the remaining transmission opportunities in the SA period to transmit the new D2D data; and
   using the remaining transmission opportunities in the SA period to transmit the new D2D data to the second UE on the available resource at a third timing, wherein the third timing is later than the second timing.

9. The method of claim 8, the new D2D data includes control information and/or data information.

10. The method of claim 8, wherein the SA is associated with a plurality of resources in a SA/Data Cycle.

11. The method of claim 10, wherein the plurality of resources are associated with a T-RPT (Time Resource Pattern for Transmission).

12. The method of claim 8, further comprises:
    determining whether to send a second SR or to trigger a BSR (Buffer Status Report) associated with the new D2D data based on the amount of remaining resources associated with the SA which the first UE could use.

13. The method of claim 12, further comprises:
    not triggering the BSR associated with the new D2D data.

14. The method of claim 12, further comprises:
    triggering the BSR associated with the new D2D data and not sending the BS the second SR associated with the triggered BSR since the amount of remaining resources associated with the SA can accommodate the new D2D data to result in BSR cancellation.

15. A method for a first User Equipment (UE) to request resources in a wireless communication system, comprising:
    establishing a connection with a base station (BS);
    sending a first scheduling request (SR) to the BS;
    receiving a control signal from the BS;
    sending a scheduling assignment (SA) for device to device (D2D) communication to a second UE at a first timing in a SA period, wherein after some transmission opportunities associated with the SA are used for D2D transmissions, there are remaining transmission opportunities in the SA period;
    considering a new D2D data available in the first UE at a second timing in the SA period, wherein the new D2D data needs to be transmitted and the second timing is later than the first timing;
    triggering a Buffer Status Report (BSR) associated with the new D2D data;

cancelling the BSR since resources of the remaining transmission opportunities associated with the SA can accommodate the new D2D data; and transmitting the new D2D data to the second UE on the resources of the remaining transmission opportunities at a third timing in the SA period, wherein the third timing is later than the second timing.

16. The method of claim 15, the new D2D data includes control information and/or data information.

17. The method of claim 15, wherein the SA is associated with a plurality of resources in a SA/Data Cycle.

18. The method of claim 17, wherein the plurality of resources are associated with a T-RPT (Time Resource Pattern for Transmission).

19. The method of claim 15, further comprises:
determining whether to send a second SR or to trigger a BSR (Buffer Status Report) associated with the new D2D data based on the amount of resources of the remaining transmission opportunities associated with the SA which the first UE could use.

20. The method of claim 19, further comprises:
not triggering the BSR associated with the new D2D data.

21. The method of claim 19, further comprises:
triggering the BSR associated with the new D2D data and not sending to the BS the second SR associated with the triggered BSR since the amount of resources of the remaining transmission opportunities associated with the SA can accommodate the new D2D data to result in BSR cancellation.

* * * * *